(12) United States Patent
O'Dwyer et al.

(10) Patent No.: US 11,341,176 B2
(45) Date of Patent: May 24, 2022

(54) QUESTION ANSWERING

(71) Applicant: INTERNATIONAL BUSINESS MACHINES CORPORATION, Armonk, NY (US)

(72) Inventors: Ivan O'Dwyer, Dublin (IE); Simon Peter O'Doherty, Dubai (AE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 343 days.

(21) Appl. No.: 16/543,677

(22) Filed: Aug. 19, 2019

(65) Prior Publication Data
US 2021/0056128 A1 Feb. 25, 2021

(51) Int. Cl.
*G06F 7/00* (2006.01)
*G06F 16/33* (2019.01)
*G06N 5/04* (2006.01)
*G06F 16/332* (2019.01)
*G06F 40/216* (2020.01)

(52) U.S. Cl.
CPC ...... *G06F 16/3344* (2019.01); *G06F 16/3326* (2019.01); *G06F 16/3334* (2019.01); *G06F 40/216* (2020.01); *G06N 5/04* (2013.01)

(58) Field of Classification Search
CPC ............. G06F 16/3344; G06F 16/3334; G06F 16/3326; G06F 40/216; G06N 5/04
See application file for complete search history.

(56) References Cited

U.S. PATENT DOCUMENTS

| | | | |
|---|---|---|---|
| 7,539,656 B2 | 5/2009 | Fratkina | |
| 8,832,064 B2 | 9/2014 | Stenchikova | |
| 8,863,233 B2 | 10/2014 | Yamahara | |
| 9,400,841 B2 | 7/2016 | Eggebraaten et al. | |
| 9,536,439 B1 | 1/2017 | Goldstein et al. | |
| 9,721,205 B2 | 8/2017 | Cook | |
| 2008/0243611 A1* | 10/2008 | Delli Santi | G06Q 30/0267 705/14.64 |
| 2008/0243783 A1* | 10/2008 | Santi | G06Q 30/0254 |
| 2009/0089044 A1* | 4/2009 | Cooper | G06F 40/30 704/9 |
| 2012/0036123 A1* | 2/2012 | Hasan | G06F 16/24 707/723 |
| 2015/0310013 A1 | 10/2015 | Allen | |
| 2016/0124951 A1 | 5/2016 | Barker et al. | |

(Continued)

OTHER PUBLICATIONS

Boyanov et al., "Building chatbots from forum data—model selection using question answering metrics", Oct. 2, 2017,https7/arxiv.org/abs/1710.00689, pp. 1-9.

(Continued)

*Primary Examiner* — Mohammad A Sana
(74) *Attorney, Agent, or Firm* — Anthony Curro

(57) ABSTRACT

Embodiments are directed to determining an intent of a query provided to a question answering (QA) system. Embodiments may map a first (e.g., literal) intent of the query to a different, underlying intent. The mapping may be achieved using a map which represents associations between query intents in a first portion of a frequency distribution of known query intents and query intents not in the first portion of the frequency distribution.

17 Claims, 6 Drawing Sheets

(56) References Cited

U.S. PATENT DOCUMENTS

2017/0242886 A1 8/2017 Jolley
2019/0318009 A1* 10/2019 Miller ................. G06F 16/3322

OTHER PUBLICATIONS

Hawkins et al., "Probing student Understanding with alternative questioning strategies", Jul. 2011, ResearchGate, https://arxiv.org/abs/1107.1825, pp. 1-5.
http://meta.stackexchange.com/questions/66377/what-is-the-xy-problem, "Meta Stack Exchange", printed Aug. 19, 2019 p. 1.
http://xyproblem.info/., "The XY Problem", printed Aug. 19, 2019, pp. 1-2.
Min et al., "A Survey of Clustering With Deep Learning—From the Perspective of Network Architecture", Jul. 17, 2018, IEEE Access, https://ieeexplore.ieee.org/stamp/stamp.jsp?arnumber=8412085, pp. 1-14.
Wikipedia, "XY Problem", https://en.wikipedia.org/wiki/XY_problem, printed Aug. 19, 2019, pp. 1-2.

* cited by examiner

QUESTION ANSWERING

BACKGROUND

Embodiments of the present invention relate generally to the field of Question Answering (QA) systems, and in particular to determining intent of a query provided to a QA system.

Question answering (QA) systems are adapted to provide answers to questions by analyzing a question and finding the answer in a database. The framework of question answering systems may therefore be regarded as similar to that of a search engine.

Typically, when a new question is provided to a QA system by a user, the question is firstly analyzed and keywords are extracted to generate information retrieval conditions. To narrow down the complexity of information retrieval, an intent (i.e. reason, nature, aim, motive, purpose or the like) of the question may be determined.

SUMMARY

Embodiments of the present invention seek to provide a computer-implemented method for determining an intent of a query provided to a QA system. Embodiments of the present invention also relates to a computer program product comprising computer-readable program code that enables a processor of a system, or a number of processors of a network, to implement such a method when executed by a processing unit.

Embodiments of the present invention also seek to provide a processing system adapted to execute this computer program code.

Embodiments of the present invention also seek to provide a system for determining intent of a query provided to a QA system.

According to an aspect of the invention, there is provided a computer-implemented method for determining intent of a query provided to a QA system. The method comprises analyzing a query provided to the QA system by a user to identify a first intent of the query. The method also comprises obtaining a frequency distribution of the occurrences of known query intents for a knowledge base with which the QA system is associated, the frequency distribution comprising a first portion comprising a set of query intents having a lower frequency of occurrence than query intents not in the first portion. The method further comprises obtaining a map associated with the frequency distribution, the map defining associations between query intents in the first portion and query intents not in the first portion of the frequency distribution. Responsive to determining the identified first intent is in the first portion of the frequency distribution, the method determines, based on the map, a second query intent associated with the first intent and not in the first portion of the frequency distribution.

According to another aspect of the invention, there is provided a computer program product. The computer program product comprises a computer readable storage medium having program instructions embodied therewith, the program instructions executable by a processing unit to cause the processing unit to perform a method according to a proposed embodiment.

According to another aspect of the invention, there is provided a computer system comprising at least one processor and the computer program product according to an embodiment. The at least one processor is adapted to execute the computer program code of said computer program product.

According to another aspect of the invention, there is provided a system for determining intent of a query provided to a QA system. The system comprises a processing component configured to analyze a query provided to the QA system by a user to identify a first intent of the query. The system also comprises an interface component configured to obtain a frequency distribution of the occurrences of known query intents for a knowledge base with which the QA system is associated, the frequency distribution comprising a first portion comprising a set of query intents having a lower frequency of occurrence than query intents not in the first portion, and to obtain a map associated with the frequency distribution, the map defining associations between query intents in the first portion and query intents not in the first portion of the frequency distribution. The system further comprises a query analysis component configured, responsive to determining the identified first intent is in the first portion of the frequency distribution, to determine, based on the map, a second query intent associated with the first intent and not in the first portion of the frequency distribution.

BRIEF DESCRIPTION OF THE DRAWINGS

Preferred embodiments of the present invention will now be described, by way of example only, with reference to the following drawings, in which.

DETAILED DESCRIPTION

Figure 1:
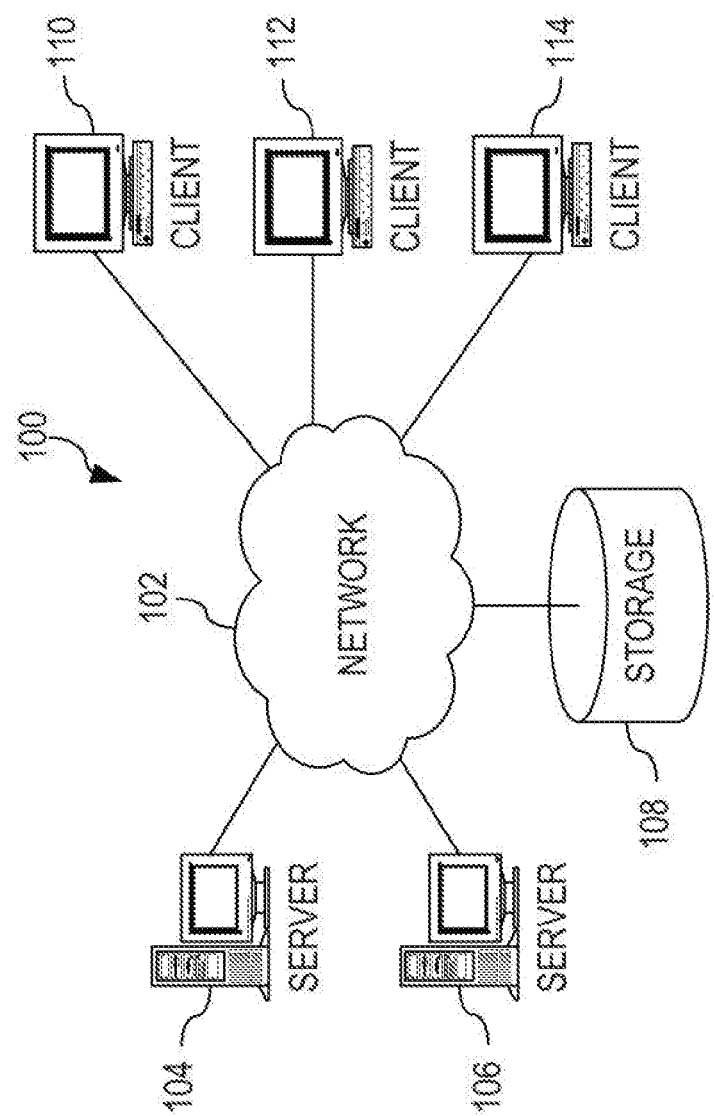
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

As mentioned above, when a question is provided to a QA system by a user, the question is firstly analyzed and keywords are extracted to generate information retrieval conditions. To narrow down the complexity of information retrieval, an intent (i.e. reason, nature, aim, motive, purpose or the like) of the user may be determined.

However, this is complicated by a common communication problem called the "XY Problem", wherein a user will have a problem X but will ask a question Y (because they believe the answer to this will help to fix X). For such indirect queries, a QA system will typically determine an incorrect intent (e.g. Y), thus making it very difficult to retrieve appropriate/correct information or answers for the real, underlying intent of the query (e.g. X).

Proposed are concepts for determining a real or underlying intent of a query provided to a QA system. Such concepts may therefore be particularly advantageous for addressing the "XY Problem", wherein a user has the real, underlying intent of obtaining information about X but provides a query that is direct or expressly related to Y (e.g. because he/she believes the answer to this will help obtain information about X).

Embodiments may therefore improve the intent determination or classification of a QA system. Unlike conventional intent determination/classification approaches, proposed embodiments may identify an intent of a query as having a low frequency of occurrence and then map that intent to a different, more frequently occurring intent that may be more representative of the real, underlying intent of the query.

The inventors propose that query intents having a lower frequency of occurrence may be poorly directed or intentionally misdirected, and thus indicative of a query that may have a differing real or underlying intent. Thus, when analyzing a query, proposed embodiments seek to identify where the identified query intent lies within a frequency distribution of the occurrences of known query intents for the relevant knowledge/topic domain (i.e. the QA system knowledge base). If the query intent is identified as being in a lower frequency of occurrence portion of the frequency distribution, it may be mapped to another query intent which is within a higher frequency of occurrence portion of the frequency distribution.

In particular, the inventors propose that the query intents in a tail segment of a rank-frequency distribution may be mapped to associated query intents having a higher frequency of occurrence (e.g. within a head segment of the rank-frequency distribution). For this, a map defining associations between query intents in the tail segment and query intents not in the tail segment of the frequency distribution may be used.

Embodiments may therefore leverage associations between rarely-asked (or obscure) query intents and commonly-asked (or more relevant) query intents for a topic domain of a QA system. These associations may be represented by a model or map which can then be used to identify, from a rarely-asked query intent, a commonly-asked query intent that may be the real, underlying intent of a query.

QA systems are particularly useful in the healthcare domain. For instance, QA systems may be used as a part of a clinical decision process, and thus may be leveraged in Clinical Decision Support (CDS) systems. Proposed embodiments may therefore be of benefit in the medical domain, and particularly beneficial for CDS. For instance, proposed embodiments may be employed in conjunction with a QA system of subject (e.g. patient) management application and/or other healthcare products so as to optimize the performance of user intent determination.

By way of further example, embodiments may be applicable to medical knowledge querying applications/systems. Concepts for improved (e.g. more accurate and/or dynamically improving) intent classification of questions provided to a closed-domain QA system may therefore be provided by embodiments.

It will nonetheless also be understood that QA systems are useful in other domains, such as document retrieval and answering questions relating to temporal and geospatial questions, questions of definition and terminology, biographical questions, multilingual questions, and questions about the content of audio, images, and video.

Some embodiments may comprise obtaining a previously-generated frequency distribution of the occurrences of known query intents for a topic domain. For instance, the generated frequency distribution may have been generated at an earlier time using established knowledge and resources, and provided via an input interface or input signal.

However, in other embodiments, obtaining a frequency distribution may comprise: generating a frequency distribution of the occurrences of known query intents for the knowledge base with which the QA system is associated; identifying a set of query intents having a lower frequency than a threshold frequency of occurrence; and defining a first portion of the frequency distribution such that first portion consists of the identified set of query intents. Embodiments may thus be configured to be 'self-sufficient' (i.e. train itself) by leveraging information/data regarding query intents that have been provided to a QA system. For instance, from historical usage data relating to queries that have been previously provided to a QA system, an embodiment may generate a frequency distribution of the occurrences of a set of known query intents. A low-frequency region or portion of the frequency distribution (i.e. a portion of the frequency distribution comprising a query intents having a lower frequency of occurrence than the remaining/other query intents) may then be identified in a relatively simple manner using a threshold frequency of occurrence.

Also, determining the threshold frequency of occurrence may be based on a power law relationship. For instance, the threshold frequency of occurrence may be determined using an inverse power law where the frequency distribution comprises a power-law distribution or long-tail distribution. An 80/20 rule (or Pareto Principle) may be used, for example, to determine a threshold frequency of occurrence which identifies the least frequently occurring 20% of the query intents.

In some embodiments, the frequency distribution may be a rank-frequency distribution of the occurrences of known query intents for the knowledge base. The first portion may then comprise a tail segment of the rank-frequency distribution comprising a set of query intents having a lower rank than query intents not in the tail segment. The tail segment may then be defined based on a threshold rank value, such that the tail segment consists of query intents having a lower rank than the threshold rank value. Again, an 80/20 rule (or Pareto Principle), or the like, may be employed to determine the threshold rank value which identifies the least frequently occurring N % of the query intents (where $0<N<=40$ for example, and preferably less than 25).

Obtaining a map associated with the frequency distribution may comprise: analyzing known query intents for the knowledge base so as to identify a correlation between a primary query intent in the first portion and a secondary query intent not in the first portion; and defining an association between the primary and secondary query intents based on the identified correlation. For example, query intents in the first portion of the frequency distribution may be analyzed for correlations with query intents outside of the first portion of the frequency distribution. For this, various features or concepts may be used to identify correlations, such as: Topic correlation: Where two query intents are closely related; Domain correlation: where query intents share a common subdomain, but low correlation; Technical: Required domain knowledge or educational level of documents; Semantic graph: How the query intent term relationships are semantically related to each other.

Further, analyzing known query intents for the knowledge base may comprise processing the known query intents with a clustering algorithm. Identification of clusters may, for example, be useful for identifying where a new occurrence of query intent will be provided as a potential XY query.

Analyzing a query provided to the QA system by a user may comprise: performing a syntactic parse of the query to generate a parsed query; matching the parsed query against a set of one or more interpretations determined to a have meaning in a context of the knowledge base; and identifying a first intent of the query based on the set of one or more interpretations. Known and established natural language processing and/or syntactic processing algorithms and concepts may therefore be leveraged by embodiments in order to analyze a query and identify a first intent of the query.

Embodiments may further comprise generating an output query for the user based on the second query intent, the output query being configured to request the user confirm or clarify an intent of the query provided to the QA system. Embodiments may thus be used to probe or question the user for further information which may be used to confirm or refine the second query intent. In this way, embodiments may provide for user-feedback to be obtained, further clarifying or confirming the real, underlying intent of the query.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
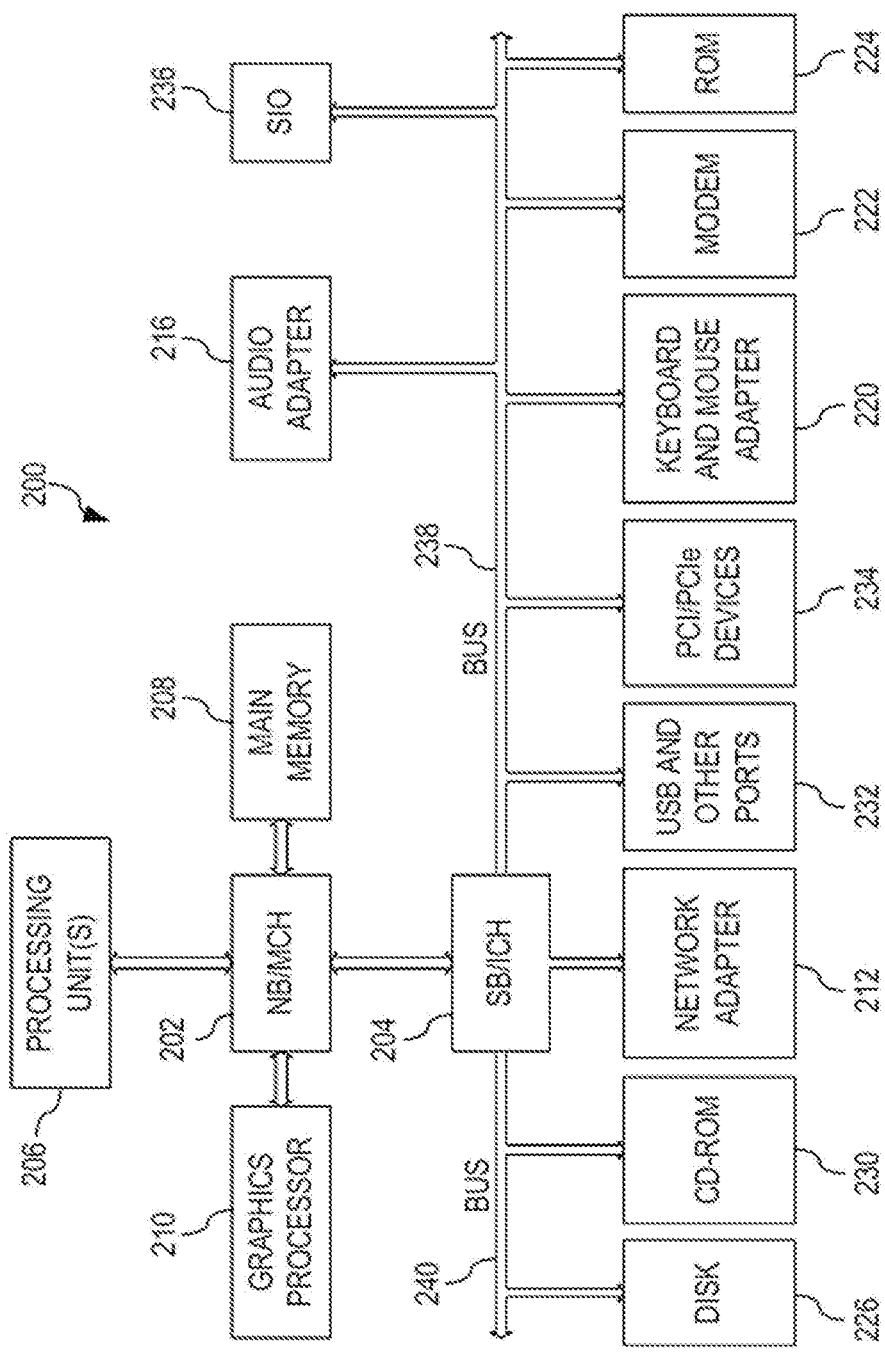
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, the system 200 may be configured to implement an interface component according to a proposed embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200. Java and all Java-based trademarks and logos are trademarks or registered trademarks of Oracle and/or its affiliates.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed. IBM, eServer and AIX are trademarks of International Business Machines Corporation in the United States and/or other countries.

Linux is a registered trademark of Linus Torvalds in the United States, other countries, or both.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments provide a method and system for determining underlying intent of a query provided to a QA system. Such embodiments may identify a first, literal (or direct) intent of the query and then analyze the first intent with respect to a frequency distribution of occurrences of known query intents for a knowledge base with which the QA system is associated. If it is identified that the first intent is within a low frequency of occurrence portion of the frequency distribution, a second query intent associated with the first intent (and not in the first portion of the frequency distribution) is identified based on map associated with the frequency distribution. The map defines associations between query intents in first portion and query intents not in the first portion of the frequency distribution. In this way, rare or infrequently used query intents can be mapped to associated query intents that are more frequently used for the knowledge base of the QA system, wherein the frequently used query intents may be more likely to represent a real, underlying query intent for that knowledge base.

Figure 3:
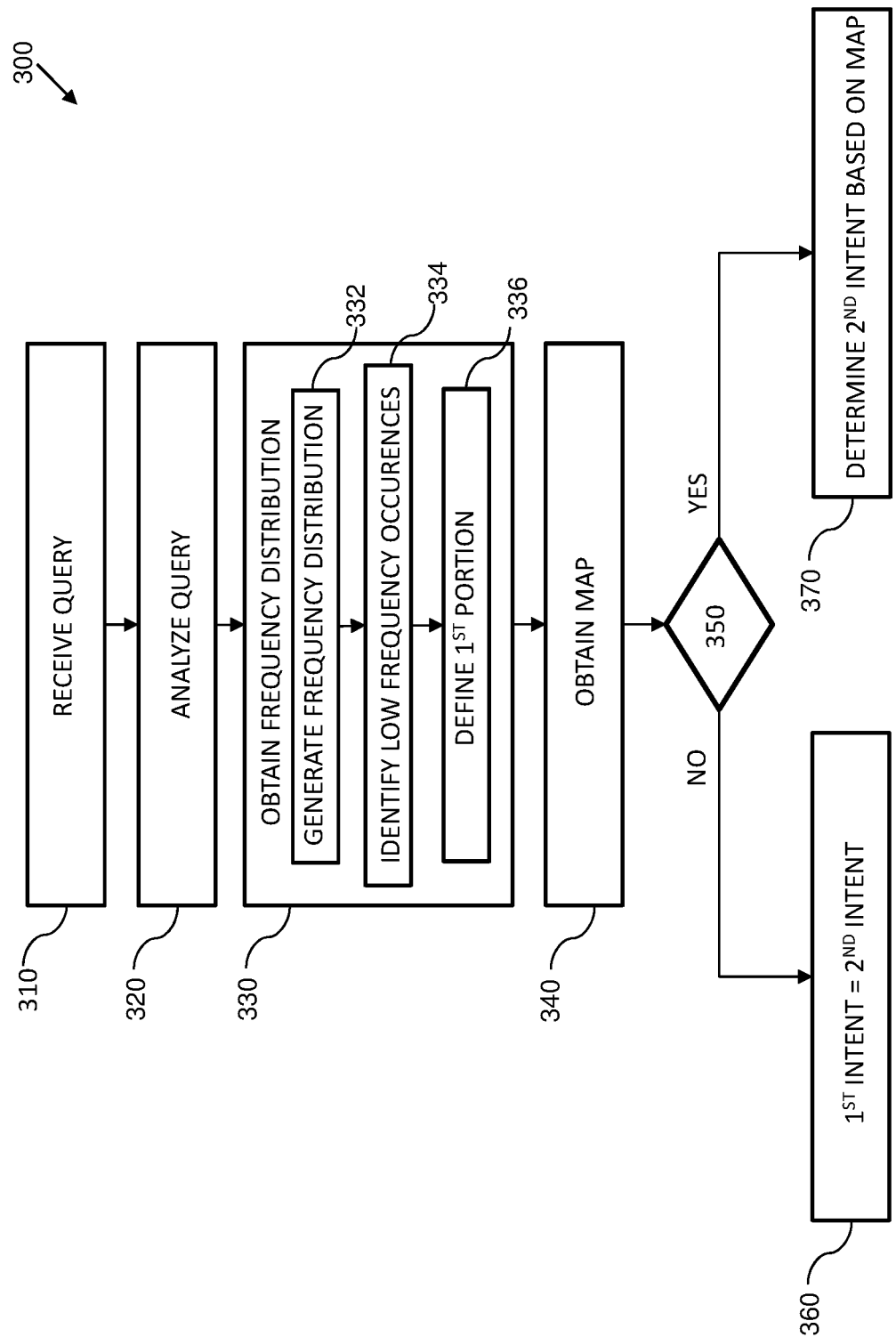
FIG. 3 is a simplified flow diagram of an exemplary embodiment of a method for determining intent of a query provided to a QA system.

Referring now to FIG. 3, an exemplary embodiment of a method 300 for determining intent of a query provided to a question answering, QA, system will be described. In this example, the QA system has an associated knowledge base (i.e. topic domain) from which it is configured to generate answers to queries.

The method 300 begins with step 310 of receiving a query from a user of the QA system. The query is provided to the QA system by the user and employs natural language.

Step 320 then comprises analyzing the query provided to the QA system so as to identify a first (e.g. literal or explicit) intent of the query. In this example, the process of analyzing the query provided to the QA system comprises: performing a syntactic parse of the query to generate a parsed query; matching the parsed query against a set of one or more interpretations determined to a have meaning in a context of the knowledge base; and identifying a first intent of the query based on the set of one or more interpretations. It will however, be appreciated that alternative approaches to analyzing the query to identify its literal or direct intent may be employed in different embodiments. For example, a wide range of machine learning, deep learning or natural language processing algorithms may be employed to extract one or more keyword and/or phrases of the query from which an intent may be identified.

Figure 4:
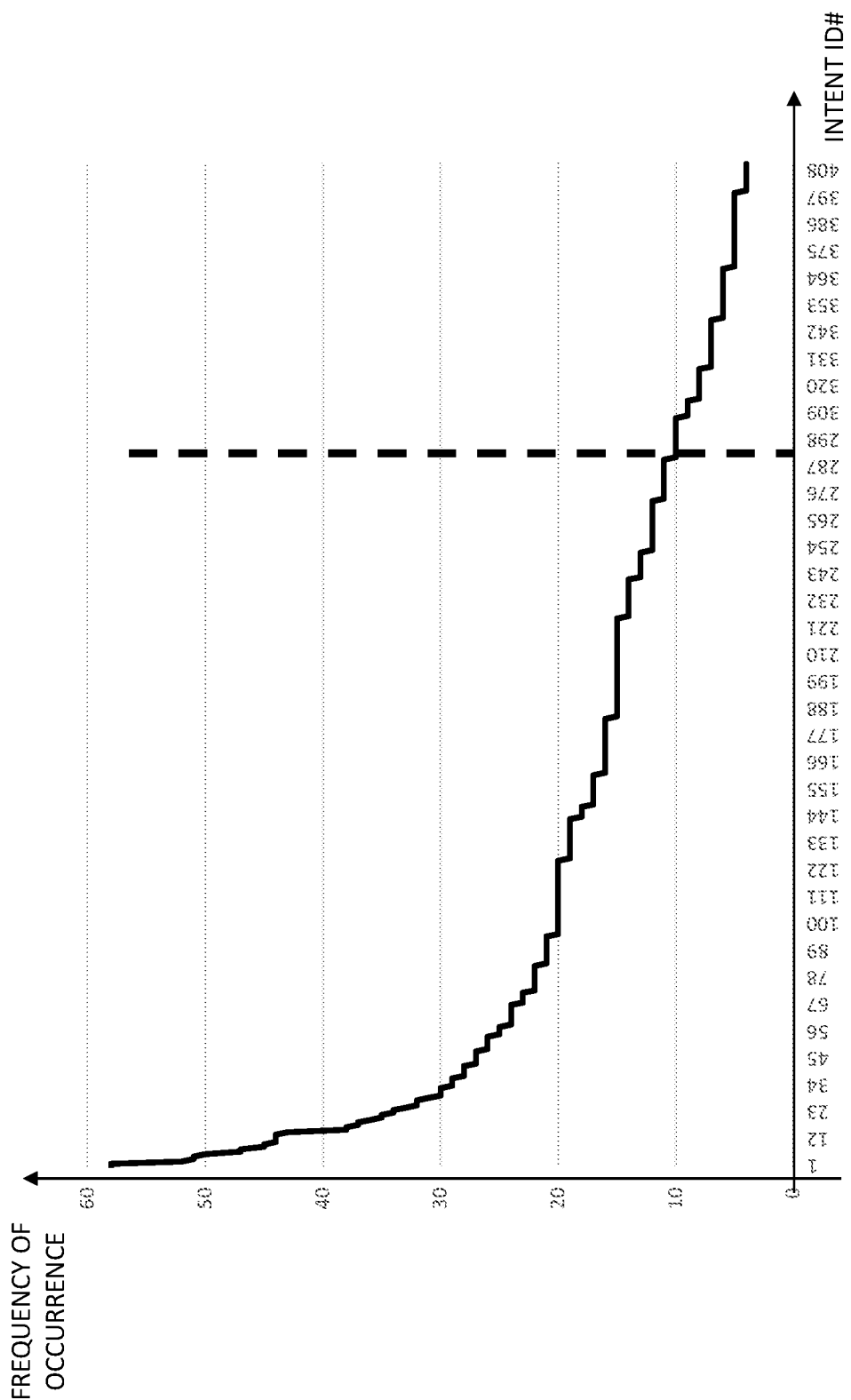
FIG. 4 illustrates an exemplary rank-frequency distribution for four hundred and ten "410" known query intents for a QA system.

Step 330 comprises obtaining a frequency distribution of the occurrences of known query intents for a knowledge base with which the QA system is associated. Here, the frequency distribution is a rank-frequency distribution of the occurrences of known query intents for the knowledge base. An example of the rank-frequency distribution is illustrated in FIG. 4.

More specifically, step 330 comprises steps 332 to 336 which generate a rank-frequency distribution and define a first (low-frequency of occurrence) portion. In more detail, step 332 comprises generating a rank-frequency distribution of the occurrences of known query intents for the knowledge base with which the QA system is associated. Then, in step 334, a set of query intents having a lower rank than a threshold rank value is identified, and, in step 336, the tail segment of the frequency distribution is defined such that tail segment includes the identified set of query intents. In some embodiments, the tail segment may consist of the identified set of query intents.

Here, the threshold rank value defines a tail segment of the rank-frequency distribution such that the tail segment consists of query intents having a lower rank than the threshold rank value. In this way, the tail segment of the rank-frequency distribution comprises a set of query intents having a lower rank than query intents not in the tail segment. The set of query intents in the tail segment may therefore be considered to consist of query intents that are rarely-used, uncommon, or irrelevant for the knowledge base of the QA system. The threshold rank value in this example is determined using an inverse power law or 80/20 rule (i.e. Pareto Principle) so that it identifies the least frequently occurring 20% of query intents.

Step 340 comprises obtaining a map associated with the rank-frequency distribution. Here, the map defines associations between query intents in the tail segment of and query intents not in the tail segment. The map may therefore be considered to model relationships or associations between rarely-used query intents and frequently-used query intents. In this way, the map be thought of as a knowledge map which can be used to map a query intent in the tail segment of the rank-frequency distribution to a query intent in the head segment of the rank-frequency distribution for example.

The method then continues to the decision process of Step 350. Step 350 comprises determining whether the identified first intent is in the tail segment of the rank-frequency distribution.

If the determination result from step 350 is 'no' (i.e. the first intent is determined to not be in the tail segment of the rank-frequency distribution), the method proceeds to step 360 wherein the first intent is determined to be the second, real/underlying intent of the query.

Conversely, if the determination result from step 350 is 'yes' (i.e. the first intent is determined to be in the tail segment of the rank-frequency distribution), the method proceeds to step 370. Step 370 comprises determining, based on the map, a second query intent associated with the first intent. In this way, the map is used to map the first query intent in the tail segment of the rank-frequency distribution to a second query intent in the head segment of the rank-frequency distribution.

The second intent is used as the real, underlying intent of the query provided to the QA system by the user. Thus, although not shown in the flow diagram of FIG. 3, an embodiment may comprise generating an output query for the user based on the second query intent. Such an output query may, for instance, be configured to request the user confirm or clarify an intent of the query provided to the QA system (e.g. by asking the user to confirm if the second intent correctly reflects/represents the real, underlying intent of the query provided to the QA system).

It will be appreciated that the completion of the method 300 for determining intent of a query provided to a QA system may map a literal or explicit intent of the query to a different, underlying intent, and such mapping may be achieved using a map which represents associations between query intents in a first portion of a frequency distribution and query intents not in the first portion of the frequency distribution.

Although in the above example embodiment the rank-frequency distribution was generated, it is to be understood that other embodiments may employ a rank-frequency distribution that has been previously established/created for the knowledge base of the QA system.

From the description above, it will be appreciated that embodiments propose the identification of common and unique query intents using a frequency distribution of known query intents for the knowledge base of a QA system. Referring to FIG. 4, which illustrates an exemplary rank-frequency distribution for four hundred and ten "410" known query intents for a QA system, it is proposed that common (i.e. frequently-used) queries are on the left side of the graph (i.e. left of the vertical dashed line). It is thus also proposed that uncommon (i.e. rarely-used) queries are on the right side of the graph (i.e. right of the vertical dashed line), or not part of the known query intents (i.e. not in the graph). The vertical dashed line may be or correspond with a threshold frequency of occurrence or threshold rank value.

By employing a knowledge map between the left and right sides of the rank-frequency distribution, embodiments may enable mapping of a rare/uncommon query intent to a frequently-used query intent that better reflects an underlying intent of a query.

For example, let us consider a usage case where a user provides a query that is identified to have a literal/explicit intent that is on the right side of the graph (e.g. in the tail segment of the rank-frequency distribution). Instead of assuming the literal/explicit intent is the actual intent of the query, an embodiment may identify one or more relationships defined by the map for the identified literal/explicit intent. If a causal relationship is found with a high enough confidence, an alternative (e.g. secondary, underlying intent) is identified and presented back to the user for confirmation and/or feedback.

To aid further understanding and appreciation of the proposed concept(s), an exemplary implementation will now be described. Such an implementation is simply provided to demonstrate use of a proposed embodiment, and it should be understood that other implementations are not limited to such process steps and algorithms only. Indeed, the skilled person will appreciate the other process steps and/algorithms may be employed to undertake and/or provide similar aspects of the proposed concept(s).

Example

User Query: "How do I reset pin 15 on my router?"

System: Intent Y found, which is located in the tail segment of the rank-frequency distribution. It is then identified that this has relationships to network speed. This counter relationship sits the tail segment of the rank-frequency distribution.

System: Reply generated "I am looking for details on this, but first can you tell me what is your exact issue?"

User Response: "I am getting disconnects on my router at random times."

System: Finds an intent but does not have a relationship to Intent Y. The system then checks alternate intents that have a relationship and suggests the best match to X.

System: "Can I clarify if X is related to the issue you are trying to solve?"

The user may still ask for the Intent Y answer, but it will be appreciated that this exemplary usage case provides an extra step to give a level of intelligence in answering the user by identifying a potential underlying intent of the user query.

Figure 5:
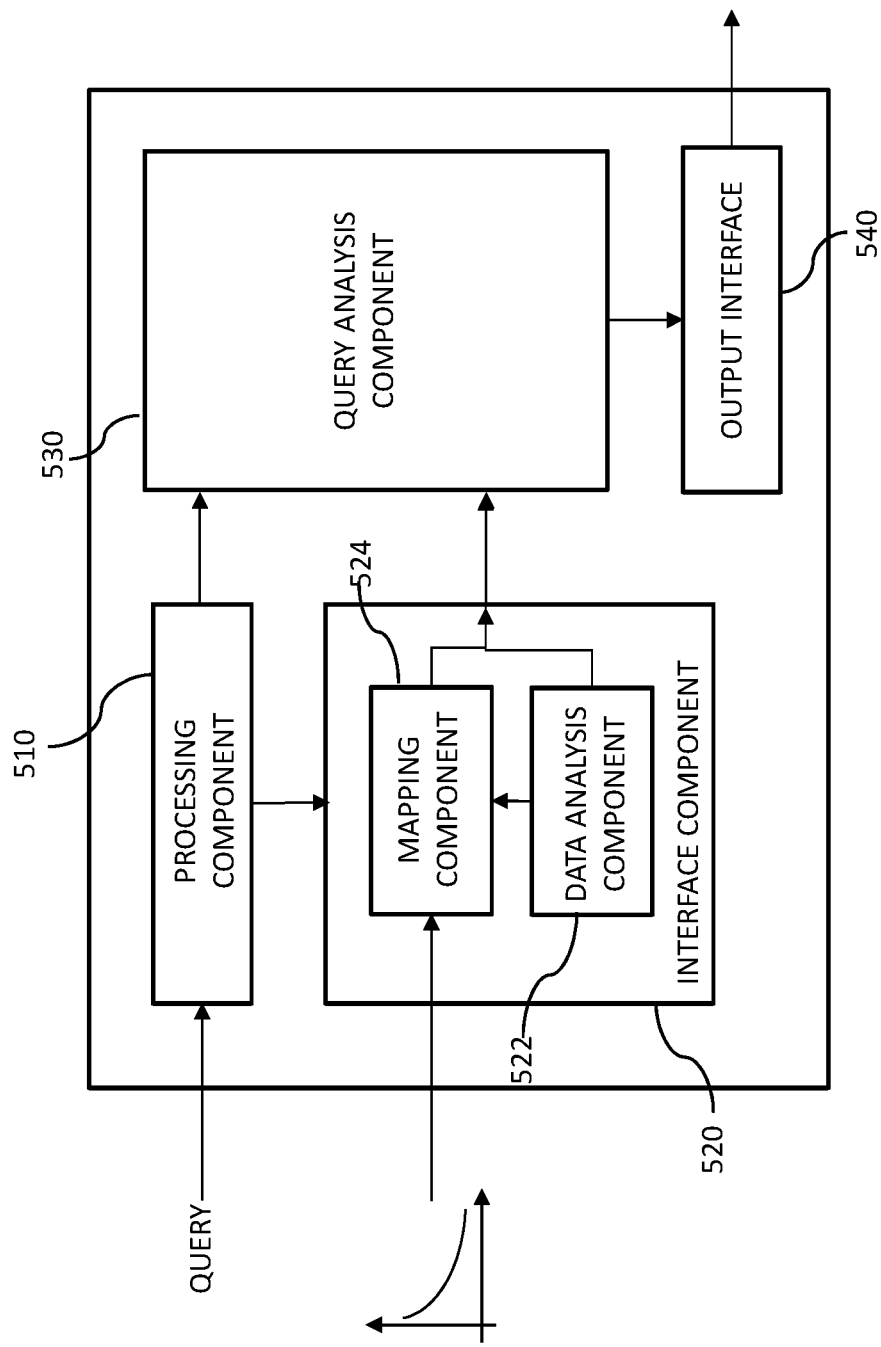
FIG. 5 is a simplified block diagram of a system for determining intent of a query provided to a QA system according to an embodiment.

By way of yet further example, FIG. 5 shows a simplified block diagram of a system 500 for determining intent of a query provided to a QA system according to an embodiment. The system 500 comprises a processing component 510, an interface component 520, a query analysis component 530 and an output interface 540.

The processing component is configured to analyze a query provided to the QA system by a user to identify a first intent of the query. The processing component 510 may thus employ conventional query parsing and analysis algorithms for identifying a literal intent of the query. By way of example, such conventional algorithms may employ machine learning, deep learning or Natural Language Processing concepts that are widely known and available.

The interface component 520 is configured to obtain a frequency distribution of the occurrences of known query intents for a knowledge base with which the QA system is associated. Here, the frequency distribution comprises a first portion comprising a set of query intents having a lower frequency of occurrence than query intents not in the first portion. The interface component 520 is also configured to obtain a map associated with the frequency distribution. The map defines associations between query intents in the first portion and query intents not in the first portion of the frequency distribution.

More specifically, in the exemplary embodiment of FIG. 5, the interface component comprises a data analysis component 522 and a mapping component 524.

The data analysis component 522 is configured to generate a frequency distribution of the occurrences of known query intents for the knowledge base with which the QA system is associated, and to identify a set of query intents having a lower frequency than a threshold frequency of occurrence. The data analysis component 522 then defines a first portion of the frequency distribution such that the first portion consists of the identified set of query intents. By way of example, the data analysis component 522 of this embodiment is configured to determine the threshold frequency of occurrence based on a power law relationship, such that the first portion comprises 15% of the known query intents for the knowledge base with which the QA system is associated.

The mapping component 524 is configured to analyze known query intents for the knowledge base so as to identify a correlation between a primary query intent in the first portion and a secondary query intent not in the first portion. Based on identified correlation, the mapping component 524 defines one or more associations between the primary and secondary query intents. By way of example, the mapping component 524 may use the following features in generating the mapping associations.

Topic correlation: where both Intents are closely related.
Domain correlation: where Intents share a common subdomain, but low correlation.
Technical: Required domain knowledge or educational level of documents.
Semantic graph: How the found term relationships are to each other, relative to other documents.

The query analysis component 530 is configured to identify if the first intent is in the first portion of the frequency distribution. Responsive to determining the identified first intent is in the first portion of the frequency distribution, the query analysis component is configured to determine, based on the map, a second query intent associated with the first intent and not in the first portion of the frequency distribution. Put another way, the query analysis component 530 is configured to map a first intent to a second, associated intent, when the first intent is found to be in the first portion of the frequency distribution.

The output interface 540 is configured to generate an output query for the user based on the second query intent. For instance, the output query may be configured to request that the user confirms or clarifies an intent of the query provided to the QA system (e.g. by informing the user of the second query intent and requesting the user to confirm if the second query intent correctly identifies the user's intent).

It is also proposed that embodiments may be configured to refine the map (e.g. at runtime) be taking account of the following exemplary features:

Question pattern: Frequency of questions in relation to where they fall within the long tail. If a user has most questions answered by the left side, they are less likely to understand the domain space.
Domain language: How frequently does the user utter domain related words. If used in context can show a slight knowledge in the topic. If used infrequently and out of reference, can trigger a higher weight of being an XY problem.
Educational level of user: Can be done by NLP algorithms to determine the educational age. This allows to weight domain language.
Created content model: Refers to content the user may have created elsewhere the system can query. For example, documentation, forums, social media. This allows to modify the weight where a causal relationship is detected.
Content reviewed: Refers to what has the end user looked at previously? What is the levels to the found intent? Items closer to the initial question (spatial) score lower if factored to the right side of the graph. This is to avoid scoring the XY problem as part of normal behavior.

Figure 6:
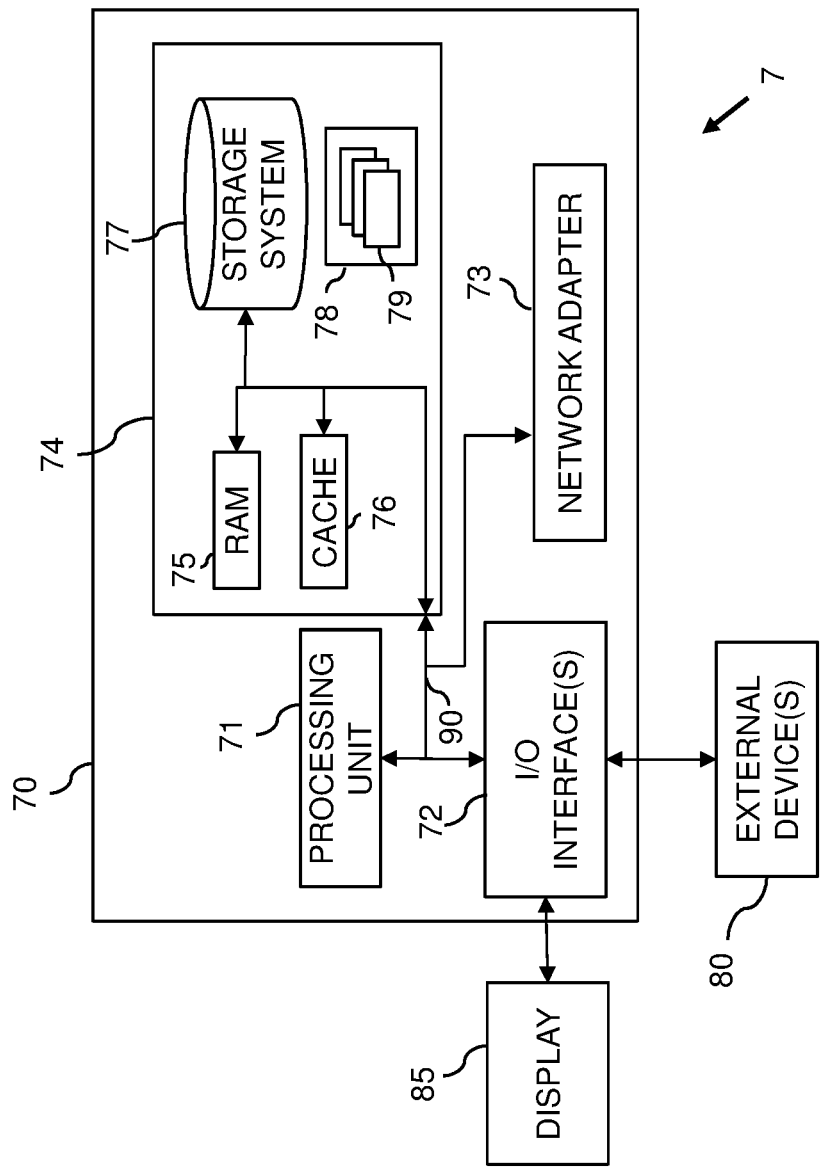
FIG. 6 illustrates a system according to another embodiment.

Embodiments may comprise a computer system 70, which may form part of a networked system 7 illustrated in FIG. 6. For instance, a query analysis component may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform, a method for determining intent of a query provided to a QA system according to a proposed embodiment.

Program/utility 78, having a set (at least one) of program modules 79, may be stored in memory 74. Program modules 79 generally carry out the functions and/or methodologies of proposed embodiments determining intent of a query provided to a QA system.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate determined query intent to a QA system or user).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

Embodiments of the present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for determining intent of a natural language query provided to a question answering (QA) system, the method comprising:
   analyzing a natural language query provided to the QA system by a user to identify a first intent of the query, the query analyzed to determine the first intent by using machine learning, deep learning, or one or more natural language processing algorithms to extract one or more keywords or phrases from which the first intent may be identified;

obtaining a frequency distribution of the occurrences of known query intents for a knowledge base with which the QA system is associated, the frequency distribution comprising a first portion comprising a set of query intents having a lower frequency of occurrence than query intents not in the first portion;

obtaining a map associated with the frequency distribution, the map defining associations between query intents in the first portion and query intents not in the first portion of the frequency distribution; and responsive to determining the identified first intent is in the first portion of the frequency distribution, determining, based on the map, a second query intent for the query associated with the first intent and not in the first portion of the frequency distribution.

2. The method of claim 1, wherein obtaining a frequency distribution comprises:

generating a frequency distribution of the occurrences of known query intents for the knowledge base with which the QA system is associated;

identifying a set of query intents having a lower frequency than a threshold frequency of occurrence; and defining a first portion of the frequency distribution such that first portion includes the identified set of query intents.

3. The method of claim 2, further comprising determining the threshold frequency of occurrence based on a power law relationship.

4. The method of claim 1, wherein the frequency distribution is a rank-frequency distribution of the occurrences of known query intents for the knowledge base, and wherein the first portion comprises a tail segment of the rank-frequency distribution comprising a set of query intents having a lower rank than query intents not in the tail segment.

5. The method of claim 4, further comprising:

defining the tail segment based on a threshold rank value, such that the tail segment consists of query intents having a lower rank than the threshold rank value.

6. The method of claim 1, wherein obtaining a map associated with the frequency distribution comprises:

analyzing known query intents for the knowledge base so as to identify a correlation between a primary query intent in the first portion and a secondary query intent not in the first portion; and defining an association between the primary and secondary query intents based on the identified correlation.

7. The method of claim 6, wherein analyzing known query intents for the knowledge base comprises processing the known query intents with a clustering algorithm.

8. The method of claim 1, further comprising:

generating an output query for the user based on the second query intent, the output query being configured to request the user confirm or clarify an intent of the query provided to the QA system.

9. A computer program product comprising a computer readable storage medium having program instructions embodied therewith, the program instructions executable by a processing unit to cause the processing unit to perform, when run on a computer network, a method for determining intent of a natural language query provided to a question answering (QA) system comprising the steps of:

analyzing a natural language query provided to the QA system by a user to identify a first intent of the query, the query analyzed to determine the first intent by using machine learning, deep learning, or one or more natural language processing algorithms to extract one or more keywords or phrases from which the first intent may be identified;

obtaining a frequency distribution of the occurrences of known query intents for a knowledge base with which the QA system is associated, the frequency distribution comprising a first portion comprising a set of query intents having a lower frequency of occurrence than query intents not in the first portion;

obtaining a map associated with the frequency distribution, the map defining associations between query intents in the first portion and query intents not in the first portion of the frequency distribution; and responsive to determining the identified first intent is in the first portion of the frequency distribution, determining, based on the map, a second query intent for the query associated with the first intent and not in the first portion of the frequency distribution.

10. A system including a processing unit and computer memory for determining intent of a natural language query provided to a question answering (QA) system, the system comprising:

a processing component configured to analyze a natural language query provided to the QA system by a user to identify a first intent of the query, the query analyzed to determine the first intent by using machine learning, deep learning, or one or more natural language processing algorithms to extract one or more keywords or phrases from which the first intent may be identified;

an interface component configured to obtain a frequency distribution of the occurrences of known query intents for a knowledge base with which the QA system is associated, the frequency distribution comprising a first portion comprising a set of query intents having a lower frequency of occurrence than query intents not in the first portion, and to obtain a map associated with the frequency distribution, the map defining associations between query intents in the first portion and query intents not in the first portion of the frequency distribution; and a query analysis component configured, responsive to determining the identified first intent is in the first portion of the frequency distribution, to determine, based on the map, a second query intent for the query associated with the first intent and not in the first portion of the frequency distribution.

11. The system of claim 10, wherein the interface component comprises a data analysis component configured to:

generate a frequency distribution of the occurrences of known query intents for the knowledge base with which the QA system is associated;

identify a set of query intents having a lower frequency than a threshold frequency of occurrence; and define a first portion of the frequency distribution such that the first portion consists of the identified set of query intents.

12. The system of claim 11, wherein the data analysis component is further configured to determine the threshold frequency of occurrence based on a power law relationship.

13. The system of claim 10, wherein the frequency distribution is a rank-frequency distribution of the occurrences of known query intents for the knowledge base, and wherein the first portion comprises a tail segment of the rank-frequency distribution comprising a set of query intents having a lower rank than query intents not in the tail segment.

14. The system of claim 13, wherein the system is configured to define the tail segment based on a threshold rank value, such that the tail segment consists of query intents having a lower rank than the threshold rank value.

15. The system of claim 10, wherein the interface component comprises a mapping component configured to:
analyze known query intents for the knowledge base so as to identify a correlation between a primary query intent in the first portion and a secondary query intent not in the first portion; and
define an association between the primary and secondary query intents based on the identified correlation.

16. The system of claim 15, wherein analyzing known query intents for the knowledge base comprises processing the known query intents with a clustering algorithm.

17. The system of claim 10, further comprising:
an output interface configured to generate an output query for the user based on the second query intent, the output query being configured to request the user confirm or clarify an intent of the query provided to the QA system.

\* \* \* \* \*